US006168071B1

(12) United States Patent
Johns

(10) Patent No.: US 6,168,071 B1
(45) Date of Patent: Jan. 2, 2001

(54) METHOD FOR JOINING MATERIALS TOGETHER BY A DIFFUSION PROCESS USING SILVER/GERMANIUM ALLOYS AND A SILVER/GERMANIUM ALLOY FOR USE IN THE METHOD

(75) Inventor: Peter Gamon Johns, 39 Richard Drive, Watford, Herts WD1 3BQ (GB)

(73) Assignee: Peter Gamon Johns (GB)

(*) Notice: Under 35 U.S.C. 154(b), the term of this patent shall be extended for 0 days.

(21) Appl. No.: 09/170,924

(22) Filed: Oct. 13, 1998

Related U.S. Application Data

(63) Continuation-in-part of application No. 08/656,235, filed on Aug. 27, 1996, now abandoned.

(51) Int. Cl.$^7$ ............................... B23K 20/00; C22C 5/00
(52) U.S. Cl. .......................... 228/193; 228/194; 228/195; 148/430
(58) Field of Search ................................ 228/193, 194, 228/195; 148/430

(56) References Cited

U.S. PATENT DOCUMENTS

| 1,614,752 | 1/1927 | Mitchell . |
| 1,643,304 | 9/1927 | Korsunsky . |

(List continued on next page.)

FOREIGN PATENT DOCUMENTS

| 508 528 | 9/1929 | (DE) . |
| 4213897 | 11/1992 | (DE) . |
| 0 067 983 | 12/1982 | (EP) . |
| 0 248 914 | 12/1987 | (EP) . |
| 925182 | 5/1963 | (GB) . |

(List continued on next page.)

OTHER PUBLICATIONS

Welding Journal, vol. 41, No. 4, Apr. 1962, pp. 106S–166S Miami, US: "Diffusion Bonding Beryllium Copper for Ultra High–Strength Joints".

AWS Welding Handbook, pp. 312–313, vol. 3, 7$^{th}$ Ed. (1980 AWS, Miami) W.H. Kearns.

(List continued on next page.)

Primary Examiner—Patrick Ryan
Assistant Examiner—Zidia D. Pittman
(74) Attorney, Agent, or Firm—Klarquist Sparkman Campbell Leigh & Whinston, LLP

(57) ABSTRACT

A method for joining two elements using a silver-based alloy having a germanium content is described. The method comprises providing two elements to be joined together, at least one of the elements comprising a silver/copper/germanium alloy having a silver content of at least 77% by weight, a germanium content of between 0.4 and 7% by weight, typically from about 0.5% to about 3%, the remainder principally being copper apart from any impurities. The alloy also contains boron as a grain refiner at a concentration of greater than 0 parts per million and less than 20 parts per million, more typically less than about 10 parts per million, with working embodiments including boron in an amount of about 2 parts per million. The two elements are placed adjacent one another such that a portion of a free surface of the silver/copper/germanium alloy contacts a portion of a free surface of the other element without interposing a filler material between the two free surfaces. The two free surfaces are heated where the two elements are adjacent one another to a temperature below that of the solidus temperature of any one of the constituent materials of the elements, thereby joining the two elements by a diffusion process. A silver/germanium alloy also is described having a silver content of at least 77% by weight and a germanium content of between 0.4 and 7% by weight, which alloy contains boron as a grain refiner at a concentration of greater than 0 parts per million and less than 20 parts per million.

21 Claims, 2 Drawing Sheets

U.S. PATENT DOCUMENTS

| | | |
|---|---|---|
| 1,720,894 | 7/1929 | Gray et al. . |
| 1,970,319 | 8/1934 | Kern . |
| 2,052,142 | 8/1936 | Kern . |
| 4,124,380 | 11/1978 | Youdelis . |
| 4,973,446 | 11/1990 | Bernhard et al. . |
| 5,039,479 | 8/1991 | Bernhard et al. . |

FOREIGN PATENT DOCUMENTS

| | | |
|---|---|---|
| 2 255 348 | 11/1992 | (GB) . |
| 63-317289 | 12/1988 | (JP) . |
| 0052237 | 2/1992 | (JP) . |
| 0339590 | 11/1992 | (JP) . |
| 1810259 | 4/1993 | (SU) . |
| 95/14112 | 5/1995 | (WO) . |

OTHER PUBLICATIONS

Chemical Abstracts, vol. 122, No. 10, Mar. 5, 1990: Lyubeshkin et al., "Solder for Soldering Electronic Components" (Abstract No. 89488).

ASM Handbook, vol. 6, pp. 156–159; 301–302 (Dec. 1993), "Welding, Brazing, and Soldering".

METHOD FOR JOINING MATERIALS TOGETHER BY A DIFFUSION PROCESS USING SILVER/GERMANIUM ALLOYS AND A SILVER/GERMANIUM ALLOY FOR USE IN THE METHOD

CROSS REFERENCE TO RELATED APPLICATION

The present application is a continuation-in-part of now abandoned U.S. application Ser. No. 08/656,235, filed Aug. 27, 1996 which is incorporated herein by reference.

FIELD OF THE INVENTION

The present invention concerns a method for joining materials together by a diffusion process using silver/germanium alloys and a silver/germanium alloy for use in the method. More particularly, the present invention concerns such a method comprising using a copper/silver/germanium alloy which does not require the introduction of an additional filler material.

BACKGROUND OF THE INVENTION

Conventionally, metals are joined by three principle methods: welding, brazing and soldering. When welding using a filler, a filler material is chosen which has a composition which is similar to the two parts being joined and the actual contact regions of the adjacent metal parts are melted to effect the join. When resistance welding or laser welding, e.g. spot welding, the adjacent metal parts to be joined are raised to a high temperature and melted, no filler metal being required to effect the join. When brazing or soldering, a filler metal is used which has an appreciably lower melting point than that of the two parts being joined such that the contact regions of the metal parts being joined are not melted. Typically, solders melt below about 450° C. Brazing uses filler metals of greater strength, which have a melting temperature of greater than 450° C. These methods all require either the use of a filler metal, which forms a liquid phase upon heating to facilitate the joining of the parts, or the melting of the adjacent metal parts to be joined. The filler metal or the melted parts of the metals to be joined then cools and solidifies, thereby creating a bond at the molecular level.

Silver and silver alloys have conventionally been joined using a brazing process. However, so-called "fire staining" occurs at the high temperatures required to effect a bond using brazing techniques.

Because of its high thermal and electrical conductivity silver and silver based alloys are well known for their use in electrical and electronic contacts. Silver is also a precious metal and is used in the manufacture of jewelry and silverware. Accordingly, it becomes necessary to create bonds between both silver and silver alloys and other metals, whether they are ferrous or non-ferrous. It also is desirable to bond ceramics or plastics to metals. This largely has been done in the past by tack welding, soldering or brazing the joints together, which introduces impurities from the fluxing agent or solder into the silver/silver alloy.

A fire stain or fire spot is caused by the oxidation of the copper at high temperatures. Additionally, it is well known that silver tarnishes easily. This is because the silver, which does not readily oxidize at ambient temperatures, reacts with sulphur or hydrogen sulphide to cause the familiar tarnishing effect. It is known that the addition of a small quantity of germanium to a silver/copper alloy slows down the rate at which the silver reacts with sulphur and hydrogen sulphide, thus reducing the tarnishing effect as well as reducing fire stain when the silver/copper/germanium alloy is heated to high temperatures at which the copper would normally oxidize.

It is possible to braze or flame anneal in air a silver/copper/germanium ternary alloy without causing the production of fire stain and to provide a finished product which is less susceptible to tarnishing. However, a filler metal is required to perform the brazing to create a bond or joint and it is also necessary to raise the temperature of the silver alloy being worked to a high temperature, thus producing large temperature gradients in a bond area.

SUMMARY OF THE INVENTION

The present invention provides a method for joining two elements using a silver based alloy having a germanium content, and silver based alloy having a germanium content, that addresses the problems noted above. One embodiment of the method comprises first providing two elements to be joined together, at least one of the elements comprising a silver/copper/germanium alloy having a silver content of at least 77% by weight, and germanium content of between 0.4 and 7% by weight, more typically from about 0.5% to about 3%. The remainder of the alloy, apart from any impurities, principally is copper and boron, particularly elemental boron, as a grain refiner at a concentration of greater than 0 parts per million and less than 20 parts per million, typically greater than about 0 parts per million and less than about 10 parts per million, with working embodiments including from about 1 to about 2 parts per million boron. The two elements are placed adjacent one another such that a portion of a free surface of the silver/copper/germanium alloy contacts a portion of a free surface of the other element without interposing a filler material between the two free surfaces. The surfaces adjacent one another are then heated to a temperature below that of the solidus temperature of any one of the constituent materials of the elements, thereby joining the two elements by a diffusion process. The heating step can comprise heating the two adjacent free surfaces of the elements to a temperature as low as about 500° C. The method also can comprise joining a plurality of superimposed elements together to create a multilayered product.

The present invention also provides an alloy useful for practicing the method. The silver/germanium alloy typically has a silver content of at least 77% by weight and a germanium content of between 0.4 and 7% by weight, typically from about 0.5 to about 3%, which alloy also contains boron as a grain refiner at a concentration of greater than 0 parts per million and less than 20 parts per million, typically greater than about 0 parts per million and less than about 10 parts per million, with working embodiments including from about 1 to about 2 parts per million boron.

Accordingly, one object of the present invention is to provide a method for joining metals without needing to provide an additional filler metal.

Another object of the present invention is to provide a method for joining metals at temperatures below the solidus temperature of the constituent materials of the parts being joined.

Still a further object of the invention is to provide a silver/germanium alloy which is particularly suited to joining by the method of the invention or by non-filler welding techniques.

DETAILED DESCRIPTION

Figure 1:
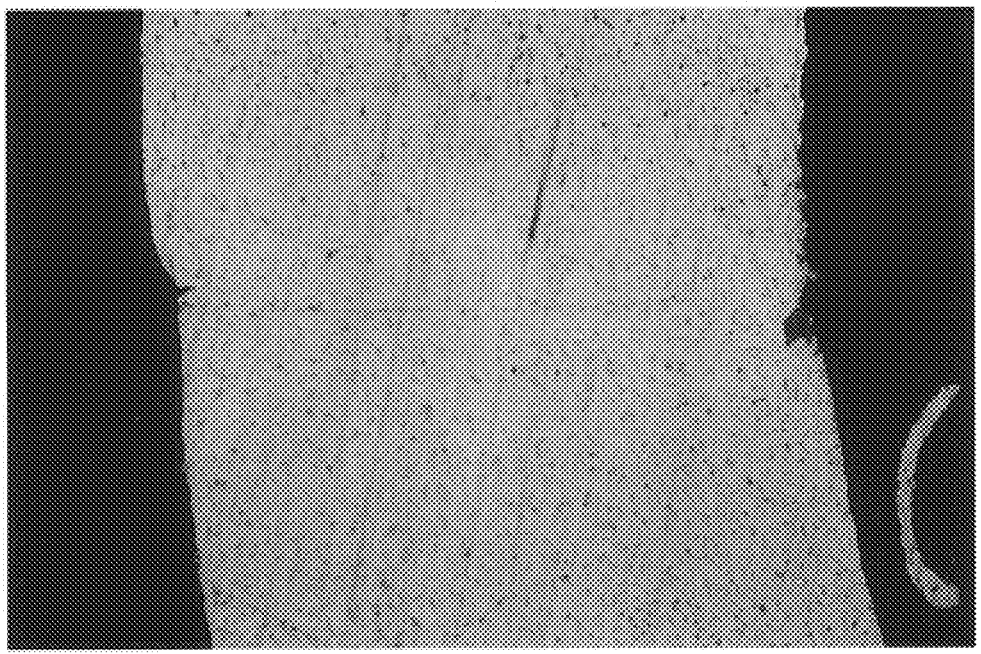
FIG. 1 is a cross-sectional representation through two metal parts A, B joined using a method according to the present invention.

In order that the present invention may be more readily understood, it will now be described with reference to the accompanying FIGS. FIG. 1 illustrates a cross-sectional representation through two metal parts A, B joined using a method according to the present invention.

Whilst it is known to be possible to braze a silver/copper/germanium alloy with less risk of fire staining the brazed areas, it has now been found that, surprisingly, it is in fact not necessary to braze such silver/copper/germanium alloy to produce a bond. Accordingly, in producing a joint using a method according to the present invention it is no longer necessary to melt the areas of the join or a filler metal or, indeed, to provide a filler metal at all.

A joint or bond in accordance with one aspect of the present invention can be formed as follows. First, the surfaces of the two pieces of material, one of which is a silver alloy containing copper and germanium, are prepared so that the surfaces to be joined (mating surfaces) do not have any large gaps between them such that the two mating surfaces are engaged over the largest possible surface area. The two pieces of material A, B (see FIG. 1) are then placed adjacent one another so that the desired physical arrangement of the joint is achieved. With the pieces of material in this position, heat energy is then applied to the joint J (FIG. 1) to cause diffusion between the adjacent mating surfaces. Heat energy is applied for a pre-determined amount of time such that the temperature of the two pieces of material being joined does not exceed the solidus temperature of any one of the constituents of the two pieces of material. Accordingly, there is no melting of the two pieces of material being joined or bonded and no filler metal is required.

As can be seen from the accompanying FIG. 1, the grain structure of both materials A, B in the joint area is substantially unaffected and the join line J is only detectable with difficulty. Thus, such joints are aesthetically pleasing, which is beneficial in jewelry applications.

The ability to form a joint using a silver/copper/germanium alloy in accordance with the present invention is thought to be due to the diffusional motion of the atoms on the mating surfaces of the two pieces of material being joined and, in particular, the bulk diffusion of the germanium atoms into vacancies on the adjacent surface of the other piece of material. Such vacancies are common on the free surfaces of metals and it is therefore possible to join, for example, a metal part comprising a silver/copper/germanium alloy to either another silver/copper/germanium alloy or to a ferrous or non-ferrous metal with the introduction of an additional filler metal. Additionally, as such vacancies may also be present in free surfaces of ceramics or other non-metallic materials such as plastics, it is also possible to join the silver/copper/germanium alloy to non-metallic materials.

All types of joints may be produced using the above described method such as butt or lap type joints.

In one embodiment of the invention the silver/copper/germanium alloy is applied as either a powder, plating or a thin coating to one of the elements to be joined. In this case, the silver/copper/germanium alloy, in whatever form, bonds as a separate element to each of the two elements to be joined.

In accordance with the invention, a silver/copper/germanium alloy powder may be bonded to another element as a means of providing a silver/copper/germanium coating or plating.

It is also possible using the above described method to produce a multi-layer composite material formed by bonding the silver/copper/germanium alloy to layers of other material, such as other metals, ceramics or plastics as required.

The above described method can be carried out at temperatures as low as 500° C., thereby obviating the need for expensive autoclave units or ovens. Joints have been achieved by maintaining the materials to be joined at this temperature for a period of minutes.

In one embodiment of the present invention the silver/germanium alloy comprises a silver content of at least 77% by weight and the germanium content comprises between 0.4 and 7% by weight, the remainder principally being copper apart from any impurities.

In a preferred embodiment of the present invention the silver/germanium alloy comprises a silver content of at least 92.5% by weight and the germanium content comprises between 0.5 and 3% by weight, the remainder principally being copper apart from any impurities.

A silver/germanium alloy which is particularly suitable for use in the method of the present invention, but which also lends itself to joining by resistance welding and laser welding techniques, comprises a silver content of at least 92.5% and a germanium content of between 0.4 and 7%, the remainder principally being copper apart from any impurities, which alloy contains boron as a grain refiner at a concentration of less than 20 parts per million, typically less than about 10 parts per million, and working embodiments have included boron in about 2 parts per million. The boron content of the resulting alloy preferably is achieved by providing the boron in a master copper/boron alloy having a 2% boron content by weight. The boron in the copper/boron alloy is elemental boron. Providing the boron content within a copper/boron alloy overcomes the problem of handling pure boron, which typically is a lightweight powder. Such copper/boron master alloys are commonly available.

Thus, it has been found that, remarkably, such low concentrations of boron provide excellent grain refining in a silver/germanium alloy. Indeed, a concentration of less than 20 parts per million, typically less than about 10 parts per million, and even as low as 0.9 parts per million, is effective for this purpose, imparting greater strength and ductility to the alloy compared with a silver/germanium alloy without a boron content and permitting strong and aesthetically pleasing joints to be obtained using a method embodying the invention or resistance and laser welding techniques.

Figure 2:
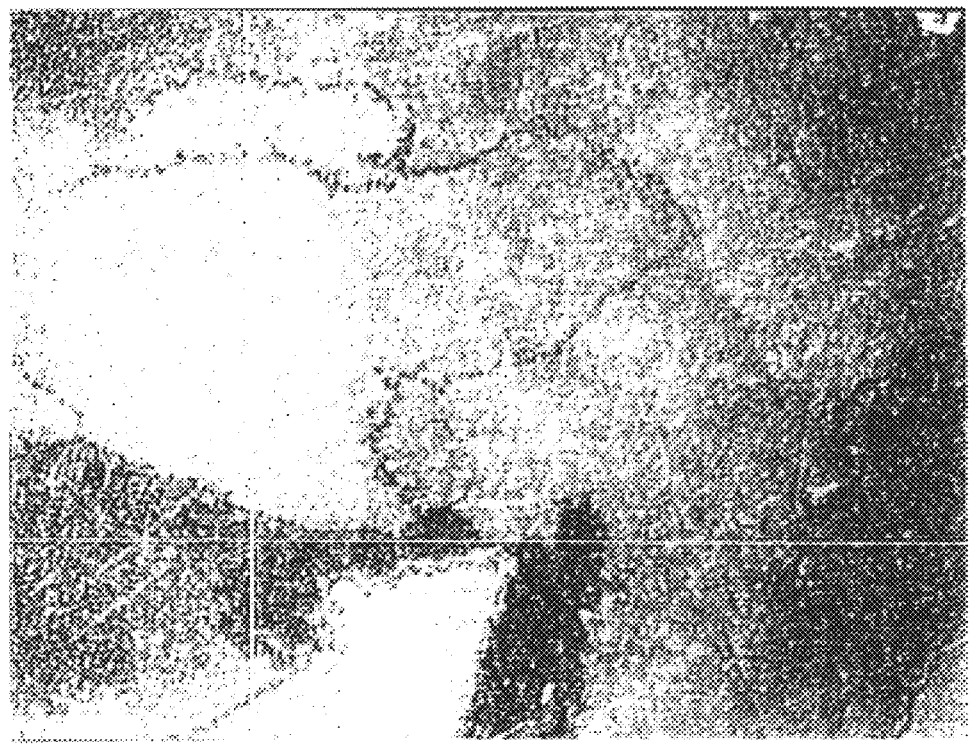
FIG. 2 is an image showing the grain structure of a silver germanium alloy made by a process other than that of the present invention.
Figure 3:
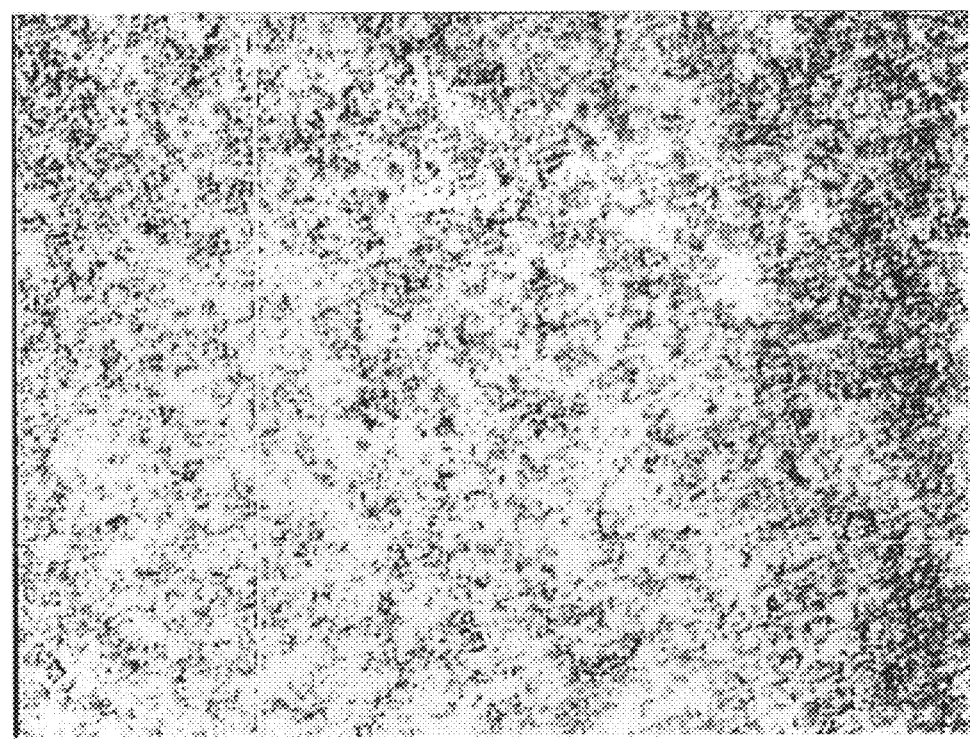
FIG. 3 is an image showing the grain structure of a silver germanium alloy, the remainder being copper with a boron concentration of 2 parts per million made by a process according to the present invention.

The benefits of the addition of boron are illustrated in FIGS. 2 and 3. FIG. 2 is a digital image of a micrograph showing the grain structure of a silver germanium alloy, the remainder being copper. The analysis of this alloy showed that the mean amount of silver was 92.63% by weight as determined by potentiometric titration, and the mean amount of germanium was about 1.1% as determined by I.C.P. FIG. 3 is a digital image of a micrograph showing the grain structure of a silver germanium alloy made according to the present invention where the remainder is copper with a boron concentration of less than about 10, and typically about 2, parts per million as determined by I.C.P. The analysis of this alloy showed that the mean amount of silver ranged from about 92.27% to about 92.39% by weight as determined by potentiometric titration, and that the germanium content ranged from about 1.09% to about 1.1% as determined by ICP.

Grain refining silver alloys has proved difficult. Persons of ordinary skill in the art generally would not consider boron to be a grain refiner for silver/germanium alloys, particularly in the amounts stated herein. But, FIG. 2 clearly shows that the grain structure, relative to that of FIG. 3, is much larger for alloys made by processes prior to the present invention without using boron as a grain refiner.

The silver/germanium alloy of the present invention is resistant to fire stain and no surface pitting of samples was observed after repeated heating (three times) to temperatures of which the copper/germanium eutectic in known silver/copper/germanium alloys would normally melt and cause pitting.

The boron in a silver/germanium alloy embodying the invention appears to inhibit grain growth even at temperatures used for soldering in the jewelry trade.

Other preferred embodiments of the silver/germanium alloy according to the present invention comprise a silver content of at least 80% or at least 83%.

The present invention has been described with respect to certain working embodiments. It should be realized that the true scope of the invention should not be limited to the particular embodiments described herein.

What is claimed is:

1. A method for joining two elements using a silver based alloy having a germanium content, comprising:
   providing two elements to be joined together, at least one of the elements comprising a silver/copper/germanium alloy having a silver content of at least 77% by weight, a germanium content of between 0.4 and 7% by weight, the remainder principally being copper apart from any impurities, which alloy contains elemental boron as a grain refiner at a concentration of greater than 0 parts per million and less than 20 parts per million;
   placing the two elements adjacent one another such that a portion of a free surface of the silver/copper/germanium alloy contacts a portion of a free surface of the other element without interposing a filler material between the two free surfaces; and
   heating the two free surfaces where the two elements are adjacent one another to a temperature below that of the solidus temperature of any one of the constituent materials of the elements, thereby joining the two elements by a diffusion process.

2. A method according to claim 1, where the germanium content comprises from about 0.5 to about 3% by weight.

3. A method according to claim 1, where both elements to be joined comprise the silver/germanium alloy.

4. A method according to claim 1, wherein the two adjacent free surfaces of the elements are heated to as low as a temperature of 500° C.

5. A method according to claim 1, where the element comprising a silver based alloy having a germanium content is a powder, plating or a thin coating.

6. A method according to claim 1, when used in the manufacture of items of jewelry, silverware or electrical or electronic contacts, or aerospace materials.

7. A method according to claim 1, wherein a plurality of superimposed elements are joined together to create a multi-layered product.

8. A silver/germanium alloy having a silver content of at least 77% by weight and a germanium content of between 0.4 and 7% by weight, which alloy contains boron as a grain refiner at a concentration of greater than 0 parts per million and less than 20 parts per million.

9. A silver/germanium alloy having a silver content of at least 77% by weight, a germanium content of between 0.5 and 3% by weight, the remainder being copper apart from any impurities, which alloy contains boron as a grain refiner at a concentration of greater than 0 parts per million and less than about 20 parts per million.

10. A method for joining two elements using a silver based alloy having a copper and a germanium content, which method comprises:
    providing two elements to be joined together, at least one of the elements consisting essentially of a silver/copper/germanium alloy having a silver content of at least 77% by weight, a germanium content of between 0.4 and 7% by weight, the remainder principally being copper apart from any impurities, which alloy contains elemental boron as a grain refiner at a concentration of greater than 0 parts per million and less than 20 parts per million;
    placing the two elements adjacent one another such that a portion of a free surface of the silver/copper/germanium alloy contacts a portion of a free surface of the other element without interposing a filler material between the two free surfaces; and
    heating the two free surfaces where the two elements are adjacent one another to a temperature below that of the solidus temperature of any one of the constituent materials of the elements thereby joining the two elements by a diffusion process.

11. A method according to claim 10, wherein the germanium content comprises between 0.5 and 3% by weight.

12. A method according to claim 10, wherein both elements to be joined comprise the silver/copper/germanium alloy.

13. A method according to claim 10, wherein the two adjacent free surfaces of the elements are heated to as low as a temperature of 500° C.

14. A method according to claim 10, wherein the silver/copper/germanium alloy is selected from the group consisting of: a powder; plating; and a thin coating of the silver/copper/germanium alloy.

15. A method according to claim 10, when used in the manufacture of items selected from the group consisting of jewelry, silverware, electrical and electronic contacts, and aerospace materials.

16. A method according to claim 10, wherein a plurality of superimposed elements are joined together to create a multi-layered product.

17. An alloy consisting essentially of a silver/copper/germanium alloy, the alloy having a silver content of at least 77% by weight, a germanium content of between 0.4 and 7% by weight, the remainder being copper apart from any impurities, which alloy contains elemental boron as a grain refiner at a concentration of greater than 0 parts per million and less than 20 parts per million.

18. An alloy according to claim 17, wherein the germanium content comprises between 0.5 and 3% by weight.

19. An alloy according to claims 17, wherein the elemental boron content is less than 10 parts per million.

20. An alloy according to claim 17, wherein the elemental boron content is about 1 part per million.

21. An alloy according to claim 17, wherein the boron is provided by a master copper/boron alloy having a boron content of about 2 percent by weight.

* * * * *

UNITED STATES PATENT AND TRADEMARK OFFICE
CERTIFICATE OF CORRECTION

PATENT NO. : 6,168,071 B1
DATED : January 2, 2001
INVENTOR(S) : Johns

It is certified that error appears in the above-identified patent and that said Letters Patent is hereby corrected as shown below:

<u>Column 5,</u>
Line 6, "ICP" should be -- I.C.P. --.

<u>Column 6,</u>
Line 59, "claims 17" should be -- claim 17 --.

Signed and Sealed this

Fourth Day of June, 2002

*Attest:*

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO.    : 6,168,071 B1
DATED         : January 2, 2001
INVENTOR(S)   : Peter Gamon Jones It is certified that error appears in the above-identified patent and that said Letters Patent is hereby corrected as shown below:

Column 1,
Line 8, should read as follows:
    -- The present application is a continuation-in-part of U.S. application No. 08/656,235, filed on May 17, 1996, and incorporated herein by reference, which was a U.S. National Stage application of international application No. PCT/GB94/02526, filed on November 17, 1994, which claimed the benefit of the earlier filing date of GB 9323787.3, filed on November 18, 1993. --

Signed and Sealed this

Twenty-fifth Day of May, 2004

JON W. DUDAS
*Acting Director of the United States Patent and Trademark Office*